United States Patent
Johnson et al.

(10) Patent No.: US 9,357,692 B2
(45) Date of Patent: Jun. 7, 2016

(54) DEPTH ADJUSTMENT FOR CONTROLLING PLANTING DEPTH

(71) Applicant: CNH Industrial America LLC, New Holland, PA (US)

(72) Inventors: Chad M. Johnson, Arlington Heights, IL (US); Johnathon R. Dienst, DeKalb, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/295,895

(22) Filed: Jun. 4, 2014

(65) Prior Publication Data

US 2015/0351311 A1  Dec. 10, 2015

(51) Int. Cl.
| | |
|---|---|
| A01B 63/26 | (2006.01) |
| A01C 5/06 | (2006.01) |
| A01B 63/00 | (2006.01) |
| A01B 63/16 | (2006.01) |

(52) U.S. Cl.
CPC ............... *A01B 63/26* (2013.01); *A01B 63/008* (2013.01); *A01B 63/166* (2013.01); *A01C 5/064* (2013.01)

(58) Field of Classification Search
CPC .... A01B 33/087; A01B 63/166; A01B 36/20; A01B 49/04; A01C 7/203; A01C 5/00; A01C 5/06; A01C 7/18
See application file for complete search history.

(56) References Cited

U.S. PATENT DOCUMENTS

| | | | |
|---|---|---|---|
| 4,307,674 A | 12/1981 | Jennings et al. | |
| 4,374,500 A | 2/1983 | Westerfield | |
| 4,896,730 A | 1/1990 | Jarrett et al. | |
| 5,081,942 A | 1/1992 | Clark et al. | |
| 5,481,990 A * | 1/1996 | Zacharias | 111/174 |
| 5,544,709 A | 8/1996 | Lowe et al. | |
| 5,619,939 A | 4/1997 | Herman et al. | |
| 5,697,455 A | 12/1997 | Deckler | |
| 5,829,535 A | 11/1998 | Line | |
| 5,887,664 A | 3/1999 | Whalen et al. | |
| 5,957,219 A | 9/1999 | Friggstad | |
| 6,148,747 A | 11/2000 | Deckler et al. | |
| 6,347,594 B1 | 2/2002 | Wendling et al. | |
| 6,386,127 B1 | 5/2002 | Prairie et al. | |
| 6,575,104 B2 | 6/2003 | Brummelhuis | |
| 6,644,223 B2 | 11/2003 | Prairie et al. | |

(Continued)

FOREIGN PATENT DOCUMENTS

| | | |
|---|---|---|
| DE | 39 22 061 A1 | 1/1991 |
| EP | 0 916 246 A2 | 5/1999 |

(Continued)

OTHER PUBLICATIONS

IN231054B Seed-Cum-Fertilizer Grain Drilling Machine, Indian Council of Agricultural Research, Dr. Bijan Kumar Dutt, Mar. 27, 2009 (6 pages).

(Continued)

*Primary Examiner* — Matthew D Troutman
(74) *Attorney, Agent, or Firm* — Rebecca L. Henkel

(57) ABSTRACT

A depth adjustment for an agricultural seed planting implement has a register with notches and a handle that engages pairs of the notches to control the depth of a seed trench opening assembly. The handle has a first handle orientation and a second handle orientation for each pair of notches and provides two different depth settings for each pair of notches in the register.

10 Claims, 8 Drawing Sheets

(56) References Cited

U.S. PATENT DOCUMENTS

| | | | |
|---|---|---|---|
| 6,659,193 B1 | 12/2003 | Best et al. | |
| 6,895,876 B2 * | 5/2005 | Bergere et al. | 111/134 |
| 6,983,705 B1 | 1/2006 | Gust | |
| 7,025,009 B2 | 4/2006 | Roibier | |
| 7,249,391 B1 | 7/2007 | Provines | |
| 7,308,859 B2 | 12/2007 | Wendte et al. | |
| 7,360,494 B2 | 4/2008 | Martin | |
| 7,360,495 B1 | 4/2008 | Martin | |
| 7,426,893 B2 | 9/2008 | Wendte et al. | |
| 7,481,278 B1 | 1/2009 | Pomedli et al. | |
| 7,861,660 B2 | 1/2011 | Martin | |
| 7,946,232 B2 | 5/2011 | Patwardhan et al. | |
| 7,975,629 B1 | 7/2011 | Martin | |
| 8,047,147 B2 | 11/2011 | Harnetiaux | |
| 8,186,287 B2 | 5/2012 | Schilling et al. | |
| 8,235,134 B2 | 8/2012 | Schilling | |
| 8,275,525 B2 | 9/2012 | Kowalchuk et al. | |
| 8,342,108 B2 | 1/2013 | Schilling et al. | |
| 8,342,258 B2 | 1/2013 | Ryder et al. | |
| 8,347,798 B2 | 1/2013 | Harnetiaux | |
| 8,356,563 B2 | 1/2013 | Schaffert et al. | |
| 8,359,987 B2 | 1/2013 | Schilling et al. | |
| 8,474,546 B2 | 7/2013 | Schilling | |
| 8,635,962 B2 | 1/2014 | Schilling | |
| 8,678,102 B2 | 3/2014 | Ryder et al. | |
| 8,684,102 B2 | 4/2014 | Ryder et al. | |
| 8,789,481 B2 | 7/2014 | Castagno Manasseri et al. | |
| 8,794,165 B2 | 8/2014 | Martin | |
| 8,909,436 B2 | 12/2014 | Achen et al. | |
| 8,925,643 B2 | 1/2015 | Georgoulias et al. | |
| 2003/0183141 A1 * | 10/2003 | Bergere et al. | 111/156 |
| 2011/0005439 A1 * | 1/2011 | Patwardhan et al. | 111/149 |
| 2011/0313575 A1 | 12/2011 | Kowalchuk et al. | |
| 2012/0042814 A1 | 2/2012 | Harnetiaux | |
| 2013/0104785 A1 | 5/2013 | Achen et al. | |
| 2013/0112121 A1 | 5/2013 | Achen et al. | |
| 2013/0255979 A1 | 10/2013 | Georgoulias et al. | |
| 2014/0151075 A1 | 6/2014 | Ryder et al. | |
| 2014/0158385 A1 | 6/2014 | Ryder et al. | |
| 2014/0299341 A1 | 10/2014 | Martin | |

FOREIGN PATENT DOCUMENTS

| | | |
|---|---|---|
| EP | 1 256 269 A1 | 11/2002 |
| WO | 2008/008345 A2 | 1/2008 |
| WO | 2008/008347 A2 | 1/2008 |
| WO | 2008/123829 A1 | 10/2008 |
| WO | 2012/149367 A1 | 1/2012 |
| WO | 2012/149415 A1 | 1/2012 |

OTHER PUBLICATIONS

Precision Matters, From Spring 2011 Edition of Farm Forum, Case IH (2 pages).

* cited by examiner

DEPTH ADJUSTMENT FOR CONTROLLING PLANTING DEPTH

BACKGROUND OF THE INVENTION

1. Field of the Invention

The present invention generally relates to agricultural seed planting implements and to the furrow opening assemblies thereon, and more particularly to the apparatus for adjusting the depth of the furrow opened by the furrow opening assembly.

2. Description of the Related Art

Farmers utilize a wide variety of seed planting implements, including seed drills and planters. In a known type of planting implement, seed planting or row units are attached to a toolbar extending transverse to the direction of planting. The toolbar is coupled to a tractor or other work vehicle suitable for pulling the planting implement along a field that is to be seeded to a crop. Each planting unit includes a ground penetrating assembly, often including one or more discs, for opening a seed trench or furrow in the ground as the planting implement is pulled across a field. Components of the ground penetrating assembly shape the bottom and sides of the seed trench, and a seed metering device provides individual seeds at a controlled rate for deposit in the seed trench. Furrow closing components of each row unit close the seed trench in a controlled manner.

It is a desirable and perhaps even primary agronomic principle that seeds should be planted at precisely controlled and consistent depths. Since a single planting implement may be used to plant several different types of crops and/or the same crop in different planting locations under different planting and growing conditions, it is necessary that the planting depth is adjustable so that the seeds are placed at a depth that has been determined to be the best for seed germination and plant growth of the particular crop under the existing and anticipated conditions.

To control planting depth, it is known to provide gauge wheels that travel on the surface of the field to control the depth to which the ground penetrating assembly can run, the positions of the gauge wheels being adjustable so that the depth of the seed trench can be controlled within fractions of an inch. Adjustment linkages are provided for changing the relative positioning of the gauge wheels with respect to the ground penetrating assembly. It is known to move the adjustment linkage by a handle connected thereto, the handle engaging a register having multiple positions for securing the handle to maintain the position to which the handle is adjusted.

As growers have gained greater understanding about seed germination and plant growth, and as soil preparation procedures have changed and improved, crop growers have demanded more precise control over seed placement both in spacing between seeds and in the depth at which the seeds are placed below the soil surface. Accordingly, there is both a demand and a need for even more precise control over the depth of the seed trench that is formed during planting operations.

What is needed in the art is a depth adjustment control for a planting implement that provides greater control over the depth to which ground penetrating components can run during a planting operation.

SUMMARY OF THE INVENTION

The present invention provides a seed planting implement with finer depth control for ground penetrating components of the implement by providing a depth adjuster assembly with a depth adjustment register and a handle engaging the register in multiple positions for each register location.

In one form thereof, the invention is directed to an agricultural seed planting implement with a ground penetrating assembly and a depth control assembly associated with the ground penetrating assembly and having adjustable positions for changing a depth to which the ground penetrating assembly can operate. The depth control assembly includes a register defining a securing location, and a handle having a first handle orientation in which the handle engages the securing location to establish a first depth for the ground penetrating assembly and a second handle orientation in which the handle engages the securing location to establish a second depth for the ground penetrating assembly.

In another form, the invention is an agricultural seed planting implement with a ground penetrating assembly, an adjustable gauge wheel supporting the ground penetrating assembly at controlled penetration depths and a depth control linkage arm adjustably positioning the gauge wheel. A handle is connected to the depth control linkage arm for axially positioning the depth control linkage arm. The handle is rotatable about a longitudinal axis thereof. A depth adjustment register includes a pair of notches engaged by the handle in a first rotational orientation of the handle for establishing a first depth for the ground penetrating assembly and in a second rotational orientation of the handle for establishing a second depth for the ground penetrating assembly.

In a further form thereof, the invention is an agricultural seed planting implement with a ground penetrating assembly and a depth control assembly adjusting the depth to which the ground penetrating assembly operates. The depth control assembly includes an adjustable arm and a register having pairs of notches for securing the position of the adjustable arm. A handle on the arm is rotatable between first and second orientations for selectively engaging each pair of notches in either the first orientation or the second orientation and defining different depths for the ground penetrating assembly.

An advantage of the depth adjustment for ground penetrating equipment disclosed herein is that the penetration depth for seed planting equipment can be controlled easily and accurately.

Another advantage of the depth adjustment for ground penetrating equipment disclosed herein is that more options are provided for planting depth control.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
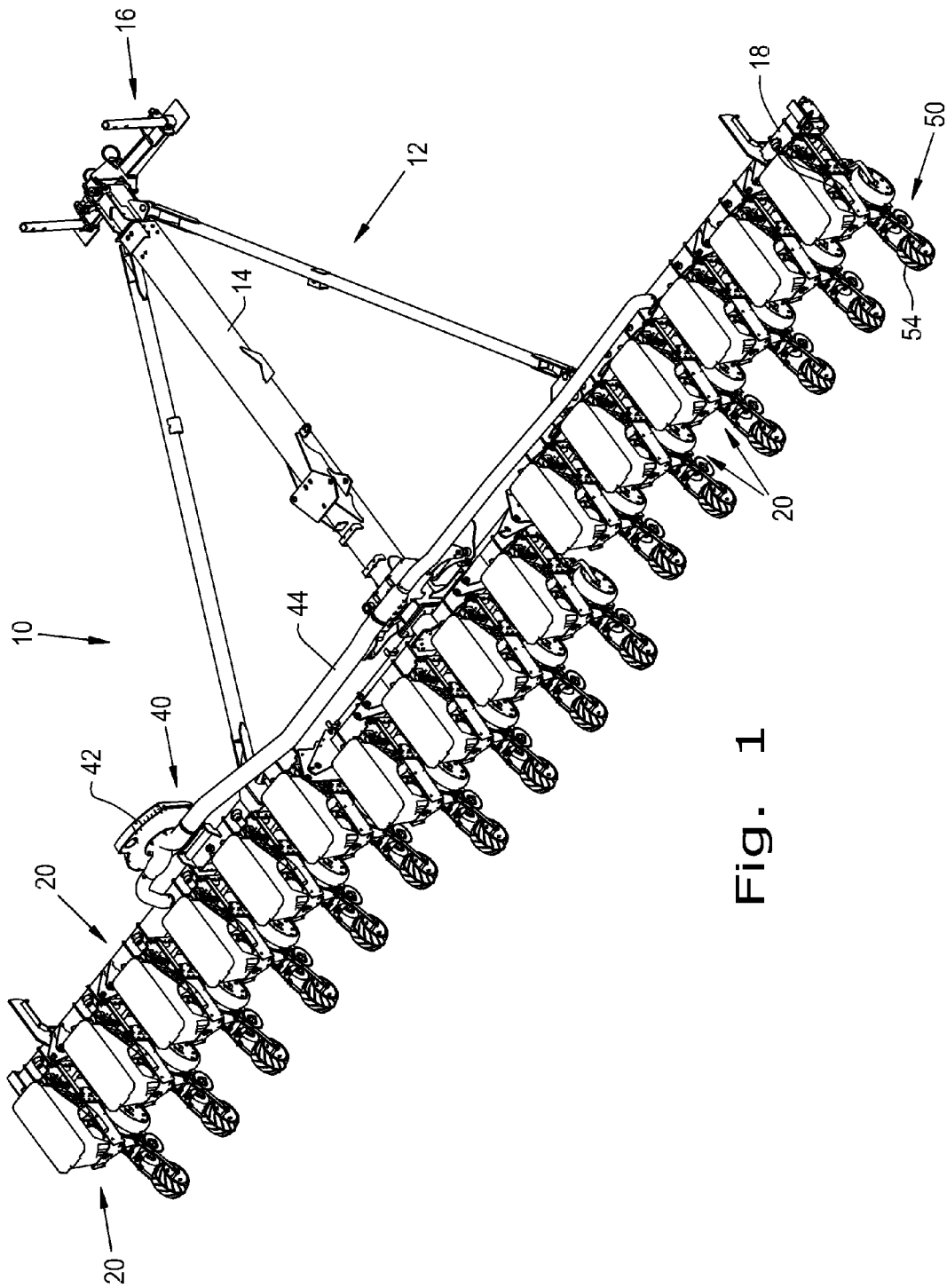
FIG. 1 is a perspective view of an agricultural seed planting implement.
Figure 2:
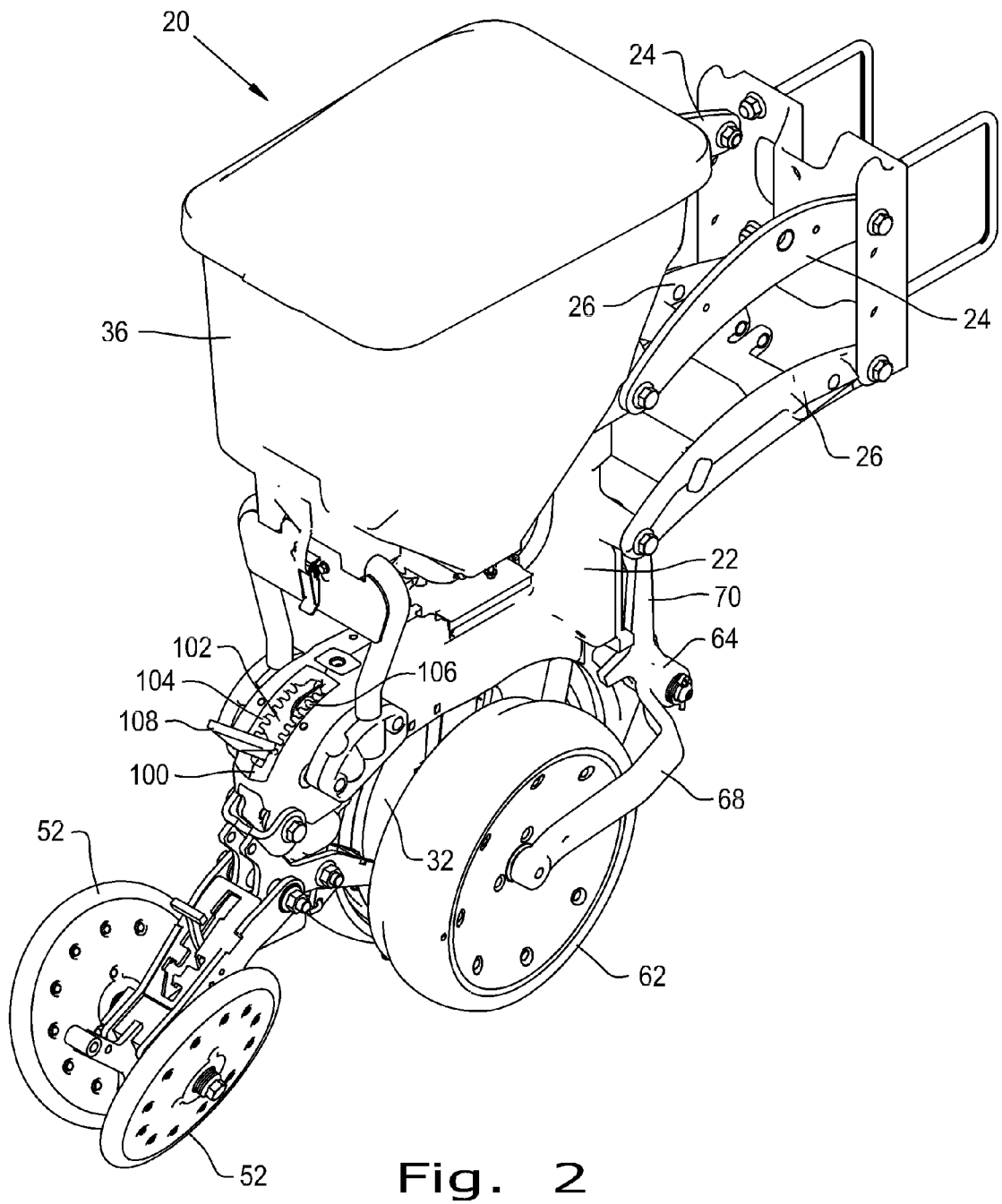
FIG. 2 is a perspective view of one of the seed planting units of the seed planting implement.
Figure 3:
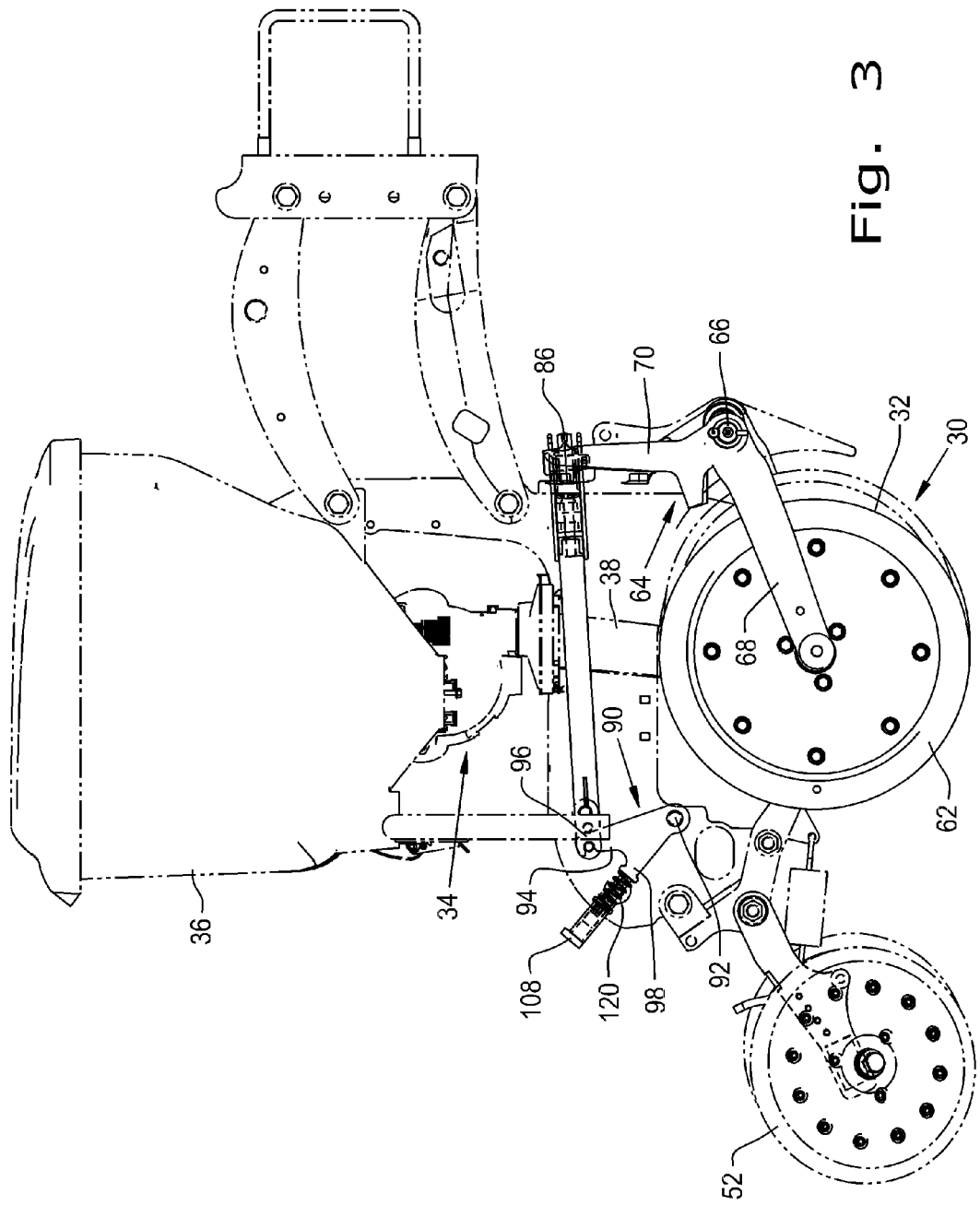
FIG. 3 is a side view of the seed planting unit.
Figure 4:
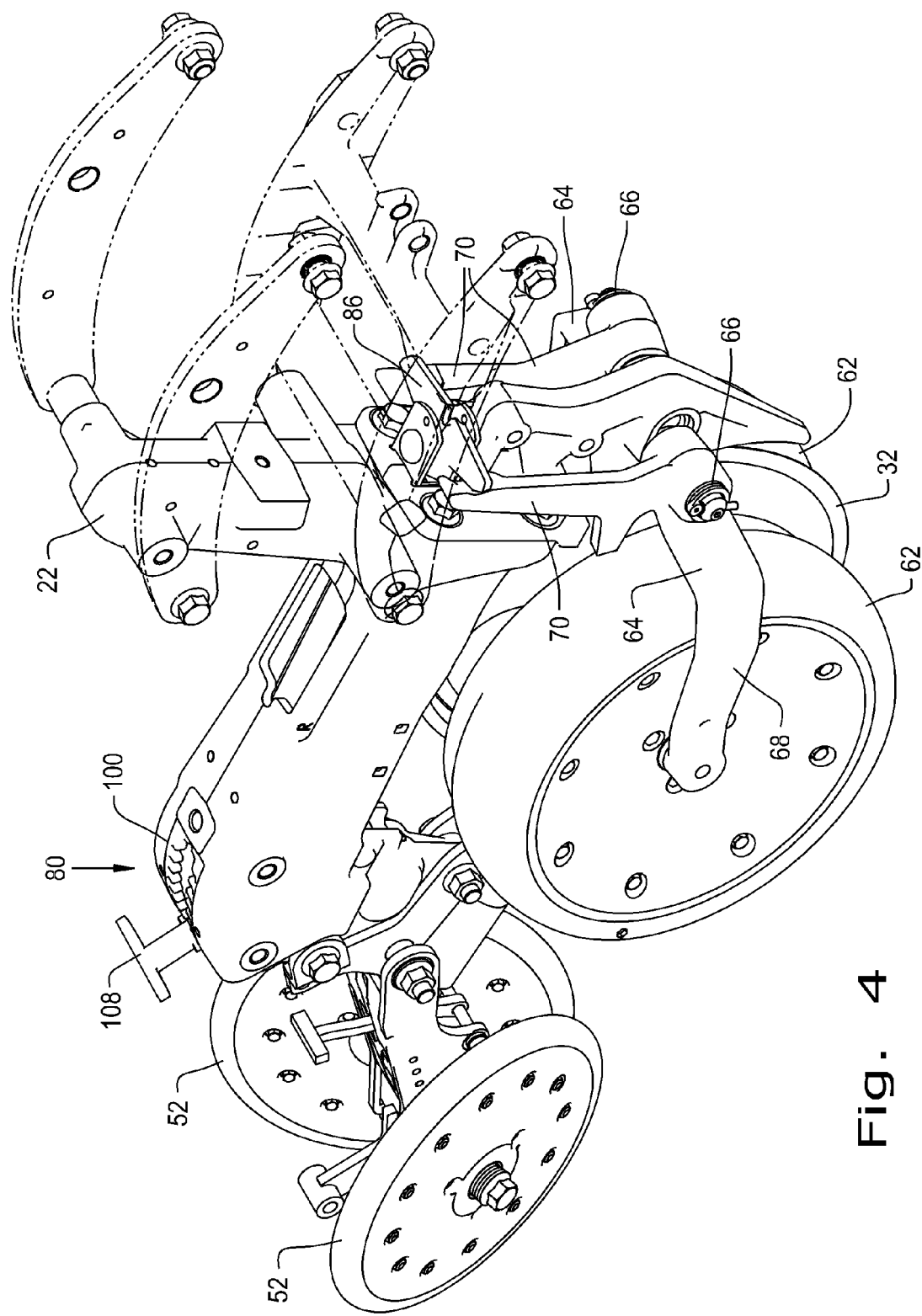
FIG. 4 is another perspective view of the seed planting unit, showing the unit from an angle different from the angle shown in the perspective view of FIG. 2.

Referring now to the drawings more specifically and to FIG. 1 in particular, a seed planting implement 10 is shown. Seed planting implement 10 has a frame that includes a tow bar assembly 12 having a tow bar 14 and a connection assembly 16 at the longitudinally forward end thereof configured for mating with a corresponding hitch of a tractor or other work vehicle (not shown) for pulling seed planting implement 10 through a field. A laterally extending toolbar 18 is generally transverse to tow bar 14 and thereby generally transverse to the direction implement 10 is towed during planting operations. A plurality of seed planting units (or row units) 20 are connected to toolbar 18 in a side by side relationship, each of the seed planting units (row units) being substantially identical to the others. In the exemplary embodiment shown, seed planting implement 10 includes sixteen seed planting units 20, only some of which are identified with reference numbers; however, it should be understood that more or fewer seed planting units can be provided on a particular seed planting implement.

Referring now primarily to FIG. 2 through FIG. 5, each seed planting unit 20 includes a frame 22 that is connected to toolbar 18 by upper arms 24 and lower arms 26, each arm 24, 26 being connected to frame 22 and to toolbar 18. Accordingly, each seed planting unit 20 extends rearward from toolbar 18 to plant a row of seeds as seed planting implement 10 is towed across a field. The individual planting units 20 are spaced along toolbar 18 to provide planted seed rows of a desired spacing. During a planting operation, forward movement of seed planting implement 10 causes each seed planting unit 20 to form a seed trench, deposit equally spaced seeds in the seed trench and close the seed trench over the deposited seeds.

Each seed planting unit 20 includes a ground penetrating or seed trench opening assembly 30 (FIG. 3) having a pair of forwardly and downwardly angled opening discs 32 that converge forwardly and downwardly to open a furrow or seed trench as seed planting implement 10 moves forward. A seed metering system 34 receives seeds from a seed hopper 36 and provides individual seeds at a controlled rate to a seed tube 38 for deposit in the bottom of the seed trench formed. A vacuum system 40 (FIG. 1), which includes a fan 42 and air lines 44, provides vacuum to seed metering system 34 for the operation of the seed metering system in supplying seeds to seed tube 38.

A seed trench closing mechanism 50 (FIG. 1) at the trailing end of each seed planting unit 20 closes the seed trench after the seeds have been deposited in the seed trench. Seed trench closing mechanism 50 includes a pair of pinch wheels 52 (FIG. 2) that operate on opposite sides of the seed trench to move soil back into the seed trench and over the seeds deposited in the bottom of the seed trench. A trailing press wheel 54 (FIG. 1) travels along the top of the closed seed trench and firms the soil replaced in the seed trench.

The depth to which opening discs 32 are allowed to penetrate the ground is controlled by a depth control assembly 60 (FIG. 5) that includes a pair of gauge wheels 62, gauge wheel arms 64 and a depth adjuster and linkage assembly 80. One of the gauge wheels 62 is provided adjacent each opening disc 32. Each gauge wheel 62 is rotatably mounted on one of the gauge wheel arms 64 that are pivotally connected at a pivotal attachment 66 to seed planting unit frame 22. Each gauge wheel arm 64 has a wheel retention segment 68 extending generally rearward from pivotal attachment 66 and a control segment 70 extending generally upward from pivotal attachment 66. Pivoting gauge wheel arm 64 about pivotal attachment 66 to frame 22 changes the relative height position of gauge wheel 62.

A pivoted position to which each gauge wheel arm 64 is placed is controlled by depth adjuster and linkage assembly 80 having a control assembly 82, a depth control linkage arm 84 and a wobble bracket 86. Control assembly 82 adjusts an axial position for linkage arm 84 and thereby the position of wobble bracket 86, with wobble bracket 86 engaging control segments 70 of gauge wheel arms 64. Raising gauge wheels 62 allows opening discs 32 to penetrate deeper into the ground, and lowering gauge wheels 62 limits the depth to which discs 32 can penetrate into the ground.

Figure 5:
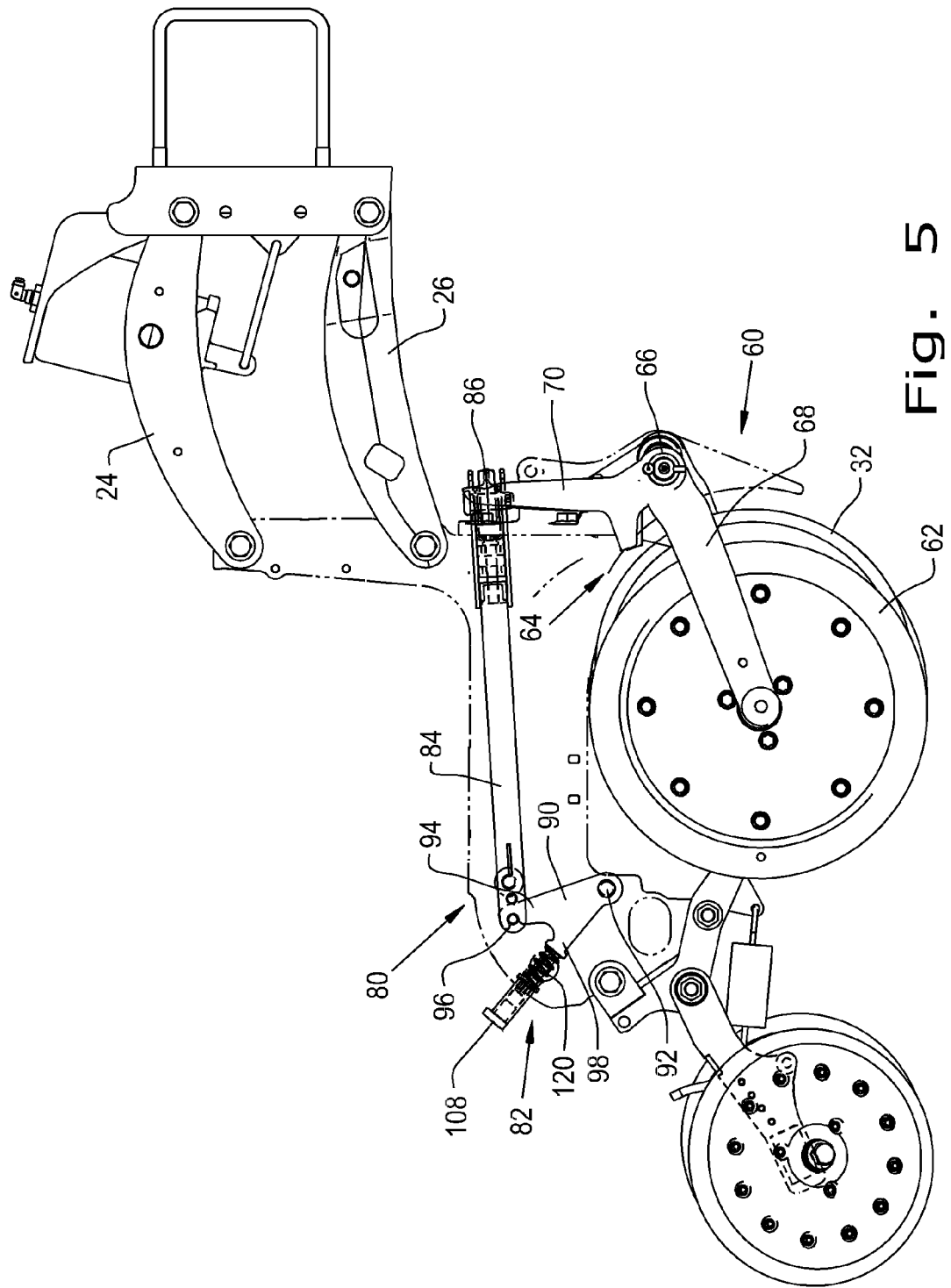
FIG. 5 is a fragmentary side view of the seed planting unit illustrating inner components used for depth adjustment.
Figure 6:
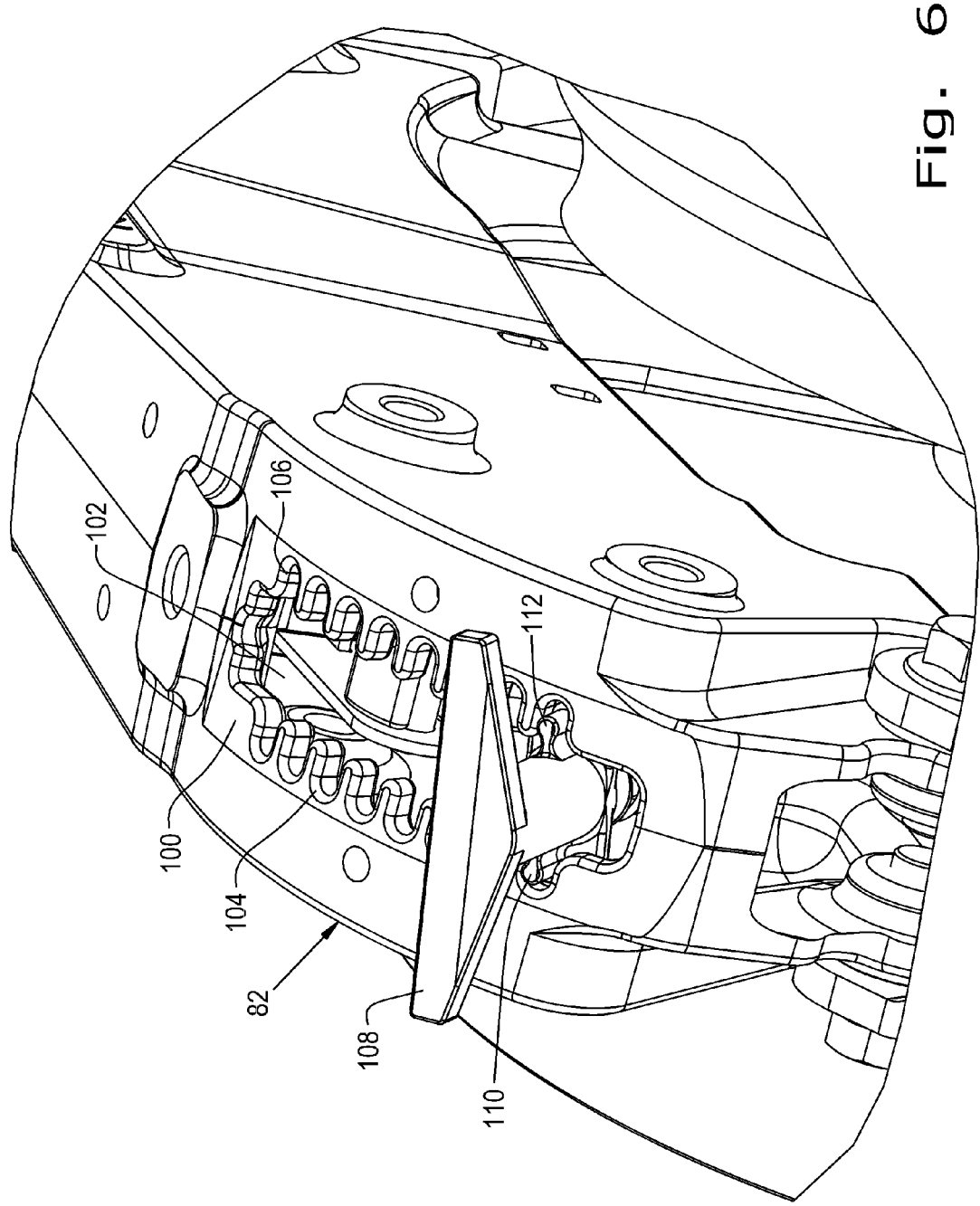
FIG. 6 is an enlarged fragmentary view of the depth adjustment register for the seed planting unit.
Figure 7:
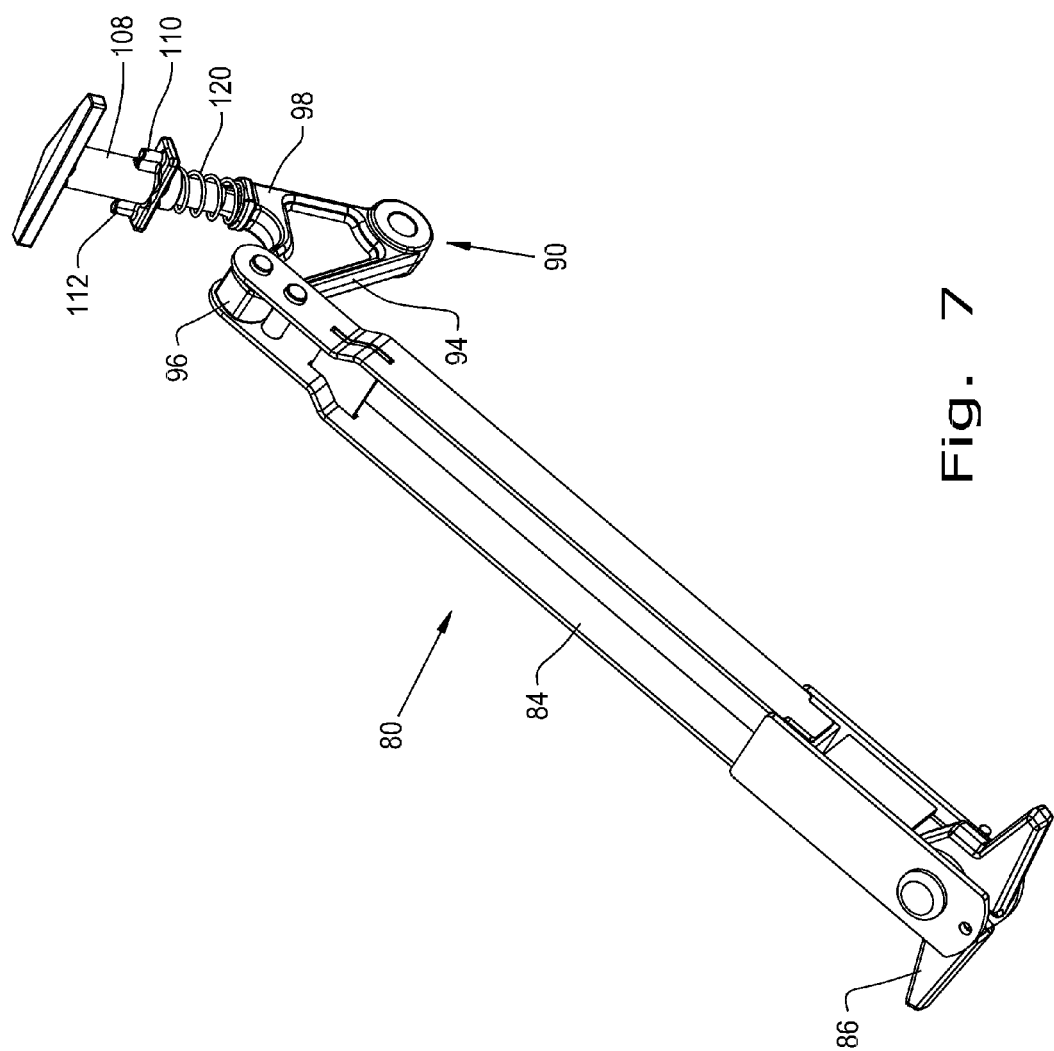
FIG. 7 is an enlarged perspective view of the depth adjuster linkage assembly of the seed planting unit.

Referring now primarily to FIG. 5 through FIG. 7, control assembly 82 includes a pivot arm 90 of general V-shape, with a pivotal connection 92 at the base thereof to seed planting unit frame 22. An inner arm 94 of pivot arm 90 has a pivotal connection 96 to depth control linkage arm 84. An outer arm 98 of pivot arm 90 extends through a depth adjustment register 100. Depth adjustment register 100 defines a slot 102 with a first row of notches 104 along one side of slot 102 and a second row of notches 106 along an opposite side of slot 102. Opposed pairs of notches including one of the notches 104 and one of the notches 106 define securing locations for securing the position of pivot arm 90 after adjustment thereof.

A handle 108 is provided on the distal end of outer arm 98 and includes laterally projecting position holding pegs 110, 112 for engaging notches 104, 106 of register 100. The pairs of notches including one of the notches 104 and one of the notches 106 secure the position of pivot arm 90 by receiving and engaging pegs 110, 112. Handle 108 is mounted on a spring 120, and can be depressed relative to outer arm 98 such that pegs 110, 112 disengage notches 104, 106 by sliding inwardly through the notches so that handle 108 can be moved fore and aft in slot 102 to align pegs 110, 112 with different pairs of notches 104, 106. As handle 108 rebounds outwardly, pegs 110, 112 slide into the pair of notches 104, 106 with which the pegs are aligned. Movement of handle 108 fore and aft pivots pivot arm 90 about its pivotal connection 92, and thereby extends or withdraws depth control linkage arm 84, to alter the position of wobble bracket 86, which in turn controls the positions of control segments 70 and thereby the allowable height of gauge wheels 62.

Figure 8:
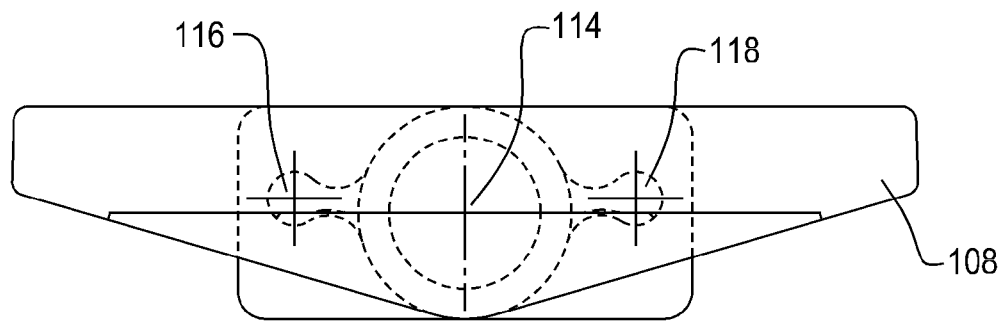
FIG. 8 is a top view of the handle of the depth control assembly in the seed planting unit.
Figure 9:
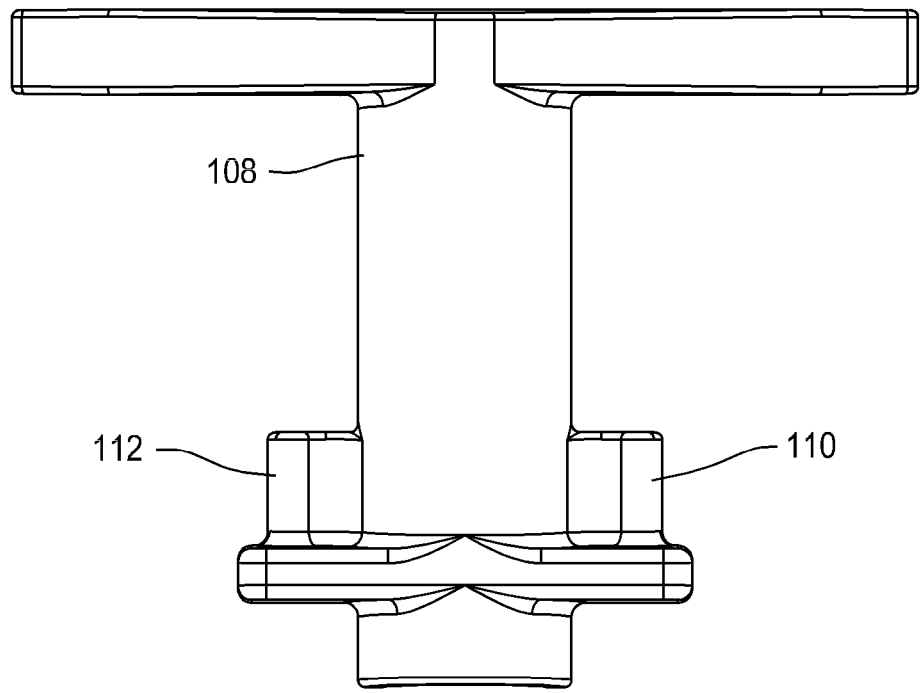
FIG. 9 is an elevational view of the handle.

With reference now particularly to FIG. 8, it can be seen that outer arm 98 defines a longitudinal axis 114 and pegs 110, 112 define longitudinal axes 116, 118 respectively. Axes 116, 118 are not aligned with axis 114; that is, a plane defined by axes 116, 118 does not include axis 114. Handle 108 is rotatable about longitudinal axis 114 so that pegs 110, 112 thereof can be selectively and alternately engaged with notches 104 and 106. That is, handle 108 can be rotated to a first orientation in which peg 110 engages a notch 104 while peg 112 engages a notch 106, or a second orientation in which peg 110 engages a notch 106 while peg 112 engages a notch 104. Rotating handle 108 by 180° from the first handle orientation to the second handle orientation changes an extended position of depth control linkage arm 84 for each pair of notches 104, 106 engaged by pegs 110, 112. For example, with handle 108 in the position shown in FIG. 6, a position in which pegs 110 and 112 are machine forward relative to axis 114, peg 110 engages the aft most notch 104 and peg 112 engages the aft most notch 106. Depth control linkage arm 84 is in a first extended position, with gauge wheels 62 positioned thereby at a first adjusted position and opening discs 32 placed at a first depth. If handle 108 is rotated such that pegs 110 and 112 are machine rearward relative to axis 114, peg 110 will engage the aft most notch 106, and peg 112 will engage the aft most notch 104, control linkage arm 84 will be in a different extended position, with gauge wheels 62 positioned thereby in a second adjusted position and opening discs 32 placed at a second depth. Accordingly, for each pair of notches 104, 106 there are two possible extended positions for depth control linkage arm 84, depending on which of pegs 110, 112 is engaged with a notch in the first row of notches 104 and which is engaged with a notch in the second row of notches 106, each different extended position for depth control linkage arm 84 resulting in a different depth for opening discs 32. Depth control assembly 60 thereby provides twice as many adjusted positions as there are pairs of notches 104, 106. Stated yet another way, for each pair of notches 104, 106 there exists two positions for handle 108 and therefore two different relative extended positions for depth control linkage arm 84, resulting in two different settings for gauge wheels 62 and thereby two different depth settings for opening discs 32. A single pair of notches can establish two depth settings, two pairs of notches can establish four depth settings, three pairs of notches can establish six depth settings, etc.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural seed planting implement, comprising:
   a ground penetrating assembly;
   an adjustable gauge wheel supporting said ground penetrating assembly at controlled penetration depths;
   a depth control linkage arm adjustably positioning said gauge wheel;
   a handle connected to said depth control linkage arm for axially positioning said depth control linkage arm, said handle being rotatable about a longitudinal axis thereof; and
   a depth adjustment register including a pair of notches, each notch of said pair of notches engaged by said handle in a first rotational orientation of said handle for establishing a first depth for said ground penetrating assembly and in a second rotational orientation of said handle for establishing a second depth for said ground penetrating assembly.

2. The agricultural seed planting implement of claim 1, said depth adjustment register including a second pair of notches, each notch of said second pair of notches engaged by said handle in said first rotational orientation of said handle for establishing a third depth for said ground penetrating assembly and in said second rotational orientation of said handle for establishing a fourth depth for said ground penetrating assembly.

3. The agricultural seed planting implement of claim 2, said depth adjustment register including a third pair of notches, each notch of said third pair of notches engaged by said handle in said first orientation of said handle for establishing a fifth depth for said ground penetrating assembly and in said second rotational orientation of said handle for establishing a sixth depth for said ground penetrating assembly.

4. The agricultural seed planting implement of claim 3, said register defining a slot with a first row of notches on one side of said slot and a second row of notches on an opposite side of said slot.

5. The agricultural seed planting implement of claim 4, said handle including first and second pegs selectively engaged with said notches, said first peg engaged with notches of said first row of notches and said second peg engaged with notches of said second row of notches in said first orientation of said handle; and said first peg engaged with notches of said second row of notches and said second peg engaged with notches of said first row of notches in said second orientation of said handle.

6. The agricultural seed planting implement of claim 1, said register defining a slot with a first notch of said pair of notches on one side of said slot and a second notch of said pair of notches on an opposite side of said slot.

7. The agricultural seed planting implement of claim 6, said handle including first and second pegs, and said handle being rotatable between a first position in which said first peg is engaged in said first notch and said second peg is engaged in said second notch and a second position in which said first peg is engaged in said second notch and said second peg is engaged in said first notch.

8. An agricultural seed planting implement, comprising:
   a ground penetrating assembly;
   a depth control assembly adjusting the depth to which said ground penetrating assembly operates;
   said depth control assembly including an adjustable arm and a register having pairs of notches for securing the position of said adjustable arm; and
   a handle on said arm, said handle being rotatable between first and second orientations for selectively engaging each pair of notches in either said first orientation or said second orientation and establishing different depths for said ground penetrating assembly in each orientation for each pair of notches.

9. The agricultural seed planting implement of claim 8, said handle having first and second pegs having longitudinal axes defining a plane and said handle having a longitudinal axis outside of said plane.

10. The agricultural seed planting implement of claim 9, said pegs being in a machine forward position relative to said axis of said handle in one of said first and second orientations and in a machine rearward position relative to said axis of said handle in the other of said first and second orientations.

* * * * *